US008545611B2

(12) United States Patent
Davies et al.

(10) Patent No.: US 8,545,611 B2
(45) Date of Patent: Oct. 1, 2013

(54) RELEASE AGENT FORMULAS AND METHODS

(75) Inventors: Gordon Davies, Carlsbad, CA (US); Mike Davies, Dana Point, CA (US)

(73) Assignee: Pala Investments Limited, Zug (CH)

( * ) Notice: Subject to any disclaimer, the term of this patent is extended or adjusted under 35 U.S.C. 154(b) by 524 days.

(21) Appl. No.: 12/300,987

(22) PCT Filed: Dec. 18, 2007

(86) PCT No.: PCT/US2007/087958

§ 371 (c)(1), (2), (4) Date: Jul. 13, 2010

(87) PCT Pub. No.: WO2009/078873

PCT Pub. Date: Jun. 25, 2009

(65) Prior Publication Data

US 2010/0279004 A1 Nov. 4, 2010

(51) Int. Cl.

| | |
|---|---|
| ***C09D 5/20*** | (2006.01) |
| ***C09D 191/00*** | (2006.01) |
| ***B29C 33/60*** | (2006.01) |
| ***C09K 3/00*** | (2006.01) |
| ***C08L 91/00*** | (2006.01) |

(52) U.S. Cl.

USPC ............... 106/2; 106/244; 106/250; 106/251; 106/266

(58) Field of Classification Search

USPC ...................... 106/2, 244, 248, 250, 251, 266

See application file for complete search history.

(56) References Cited

U.S. PATENT DOCUMENTS

| | | | | | |
|---|---|---|---|---|---|
| 5,658,374 | A | * | 8/1997 | Glover | 106/2 |
| 5,709,739 | A | * | 1/1998 | Wittich et al. | 106/38.22 |
| 5,900,456 | A | * | 5/1999 | Hashiuchi et al. | 524/588 |
| 6,902,606 | B1 | * | 6/2005 | Davies | 106/2 |
| 2004/0214734 | A1 | * | 10/2004 | King et al. | 508/437 |
| 2004/0248744 | A1 | * | 12/2004 | King et al. | 508/437 |
| 2007/0108659 | A1 | * | 5/2007 | Althoff et al. | 264/300 |

* cited by examiner

*Primary Examiner* — Anthony J Green

(74) *Attorney, Agent, or Firm* — Alston & Bird LLP

(57) ABSTRACT

A release agent and method for using the same is provided. The release agent may have a high viscosity and gravity measurement and allowing for incorporation of a plurality of alternative oils and greases to be used as coating agent. Additionally, the release agent is adaptable for multiple uses by an end user as a coating agent without the need for reapplication of the release agent after every use. Moreover, the release agent may have additives such as anti-oxidants, preservatives, and emulsifiers that may allow for longer shelf life, easier coating and the like. Still further, the release agent may incorporate coloring and fragrances to make the agent more user friendly and easier to identify for coating purposes by the end user. The release agent may also incorporate freezing point depressants, anti-oxidants, emulsifiers, fragrances and solvent additives to increase shelf life and efficacy of the release agent.

12 Claims, 3 Drawing Sheets

RELEASE AGENT FORMULAS AND METHODS

FIELD OF THE INVENTION

The present invention relates generally to chemical coatings. The present invention relates more particularly to an improved release agents for mitigating undesirable sticking of asphalt, concrete, and the like to various surfaces.

BACKGROUND OF THE INVENTION

Prior art release agents for mitigating undesirable sticking of asphalt and concrete to these and other surfaces are well known. These release agents are commonly used to mitigate the sticking of such material to the surfaces of containers, mixers, forms and the like.

As those skilled in the art will appreciate, it is undesirable to have asphalt and concrete stick to such surfaces. When these materials stick to containers and mixers, it is often necessary to clean these items. Cleaning containers and mixers is typically a labor intensive task and is therefore generally time consuming and expensive.

Forms are used to define the shape of structures to be formed with concrete. For example, a wooden form may be used to define the shape of a roadway to be made by pouring concrete into the form. Once the material has cured somewhat, the form is typically removed. Of course, if the concrete sticks to the form, then it may be very difficult to remove the form from the structure.

Asphalt is commonly transported in the bed of a truck, such as for delivery from an asphalt plant to a job site. It is undesirable to have the asphalt stick to the truck bed.

Release agents are commonly applied to containers, mixers, truck beds and forms prior to pouring asphalt or concrete into them. Release agents are applied in numerous ways, including brushing, swabbing, or spraying, and upon application act as a physical barriers to mitigate adhesion of the asphalt or concrete to the relevant surfaces. This is somewhat analogous to the use of butter or shortening to mitigate the sticking of cake batter to a pan.

A commonly used release agent is diesel fuel. Diesel is inexpensive, readily available, and works reasonably well. It adheres fairly well to most surfaces, due to its high viscosity of around 68 (for no. 2D). Diesel is also relatively heavy, having a specific gravity of about 25 to 40 (with "Grade 1-D" around 40 and "Grade 2-D" around 35). Unfortunately, use of diesel fuel is unnecessarily polluting to the environment.

Some contemporary release agents comprise soybean oil in combination with various chemicals and additives. For example, it is known to use a mixture of 20%, by weight, or more of water in combination with soybean oil as a release agent. Various additives may be included to enhance emulsification of the water and soybean oil, encourage foaming, help the mixture spread when applied, make the mixture more visible, and/or provide a desired scent.

Although contemporary release agents have found widespread acceptance in the marketplace, such formulations suffer from inherent deficiencies. For example, a contemporary release agent comprising a mixture of soybean oil and water can generally only be used once. That is, a new application of such a contemporary release agent is generally required for each use. For example, each time a mixer or truck bed is filled with concrete or asphalt, or each time a wooden form is used for one of these materials, the release agent must typically be re-applied.

The re-application of a release agent for each use of a container, mixer, or form is undesirably costly. Not only must additional quantities of the release agent be used, but labor must be expended to perform the task of re-application.

Prior attempts to mitigate the deficiencies of such contemporary release agents include the use of permanent or semi-permanent anti-stick coatings, such as Teflon™ (a federally registered trademark of du Pont de Nemours and Company of Wilmington, Del.), as disclosed in U.S. Pat. No. 4,087,072, entitled FORM MEANS FOR FABRICATING PRE-CAST STRUCTURAL PANELS. However, in many applications the abrasive nature of asphalt and concrete makes the use of such permanent or semi-permanent coatings impractical. That is, the Teflon coating must be reapplied or the coated item must be discarded more frequently than is economically feasible.

In view of the foregoing, it is desirable to provide a more durable, yet economically feasible, release agent for mitigating undesirable sticking of asphalt, concrete, and the like to various surfaces.

SUMMARY OF THE INVENTION

The present invention relates to a release agent and method for using same. More specifically, the present invention relates to a release agent having a high viscosity and gravity measurement and allowing for incorporation of a plurality of alternative oils and greases to be used as coating agent. Additionally, the release agent is adaptable for multiple uses by an end user as a coating agent without the need for reapplication of the release agent after every use. The present invention may have a release agent which incorporates freezing point depressants, anti-oxidants, emulsifiers, fragrances and solvent additives to increase shelf life and efficacy of the release agent.

To this end, in an exemplary embodiment of the present invention a release agent is provided. The release agent has at least an oil component having a high viscosity and specific gravity, an anti-oxidant, an emulsifier, and a surfactant.

In an exemplary embodiment, the release agent has a viscosity of between approximately 65 cSt and approximately 75 cSt.

In an exemplary embodiment, the release agent has plurality of different oil components.

In an exemplary embodiment, the release agent has an oil component wherein the oil component comprises unfiltered vegetable oil.

In an exemplary embodiment, the release agent has an oil component wherein the oil component comprises filtered vegetable oil.

In an exemplary embodiment, the release agent comprises unfiltered vegetable oil having approximately 6% to approximately 10%, by weight, of solids.

In an exemplary embodiment, the release agent has surfactants that are soluble in organic solvents and water.

In an exemplary embodiment, the release agent has a coloring component to color the release agent.

In an exemplary embodiment, the release agent has less than 2 wt % water.

In an exemplary embodiment, the release agent has release agent having a specific gravity of between approximately 0.90 and approximately 0.95.

In an exemplary embodiment, the release agent has an emulsifier whereby the emulsifier is lactic acid.

In an exemplary embodiment, the release agent has an emulsifier whereby the emulsifier includes any of: a citric acid, acetic acid, tartaric acid, and propylene glycol.

In an exemplary embodiment, the release agent has an anti-oxidant that is added to the release agent to prevent oxidation of the oil and to provide stability, long shelf-life and odor control.

In an exemplary embodiment, the release agent has at least and oil component comprises a combination of fats, filtered oil, unfiltered oil and greases.

To this end, in an exemplary embodiment of the present invention, a method for coating a device is provided. The method comprises the steps of: applying a release agent having at least an oil component; providing a emulsifier to said release agent; providing an anti-oxidant to the release agent; mixing a coloring agent to the release agent; applying the release agent to the device prior to pouring asphalt and concrete into a form that defines a structure; and removing the device from the structure.

In an exemplary embodiment, the method comprises the step of: providing a structure wherein the structure comprises a roadway or sidewalk.

In an exemplary embodiment, the method comprises the step of: providing a structure wherein the structure comprises a building component.

In an exemplary embodiment, the method comprises the step of: the device may be a wood retaining structure.

In an exemplary embodiment, the method comprises the step of: the release agent is reusable multiple times without re-application of the release agent to the device.

In an exemplary embodiment, the method comprises the step of: adding a fragrance to the release agent to cover up odors and to identify that the release agent has been applied to the device.

It is therefore an objective of the present invention to provide a release agent whereby the release agent has a high viscosity and gravitational measurement for use as a coating agent.

In another exemplary embodiment of the present invention, a release agent is provided whereby the release agent may be comprised of an oil.

In still a further exemplary embodiment of the present invention, a release agent is provided whereby the release agent may be comprised of at least an oil and/or grease component.

Yet another exemplary embodiment of the present invention is to provide a release agent whereby the release agent may be comprised of the combination of oil, grease and water.

Still another exemplary embodiment of the present invention is to provide a release agent whereby the release agent may be comprised of only oil an grease.

In a further exemplary embodiment of the present invention, a release agent may be provided whereby the release agent may be partially comprised of any combination of peanut oil, kernel oil, cottonseed oil, maize oil, mustard seed oil, palm kernel oil, palm oil, palm oil, palm stearin, rapeseed oil, safflower seed oil, sesame seed oil, soy bean oil, sunflower seed oil and/or other edible vegetable oils.

Another exemplary embodiment of the present invention is to provide a release agent whereby the release agent may be comprised of at least a virgin oil whereby a virgin oil may be purified by washing with water, settling, filtering and centrifuging.

In another exemplary embodiment of the present invention, an improved release agent may be provided whereby the agent may be utilized to be adapted for use with asphalt, concrete and the like.

Yet another exemplary embodiment of the present invention is to provide an improved release agent whereby the release agent may have a viscosity greater than approximately 65 cSt.

In still another exemplary embodiment of the present invention, a release agent may be provided whereby the release agent may have a specific gravity less than approximately 0.95.

Still another exemplary embodiment of the present invention is to provide a release agent whereby the release agent may be comprised of a biodegradable and otherwise environmentally friendly oil.

Another exemplary embodiment of the present invention is to provide a release agent whereby the release agent may be filtered or unfiltered.

In another exemplary embodiment of the present invention, a release agent is provided whereby the release agent may have a very small solid composition whereby the solids would make up approximately 6-10 weight percent (wt %).

Yet another exemplary embodiment of the present invention is to provide an improved release agent whereby the release agent may comprise a small percentage of water whereby the contemplated percentage of water is less than 20 wt % water, and more preferably less than 2 wt % weight.

In another exemplary embodiment of the present invention, a release agent is provided whereby the release agent may comprise no water components.

Still another exemplary embodiment of the present invention is to provide a release agent whereby the release agent may contain at least a freezing point depressant.

Yet another exemplary embodiment of the present invention is to provide a release agent having a freezing point depressant whereby the depressant may ensure proper product viscosity and flow characteristics in extreme environments whereby the depressant may be a propylene glycol, chloride slats, liquid magnesium chloride or other freezing point depressant.

Yet a further exemplary embodiment of the present invention is to provide a release agent whereby the release agent may further comprise a foaming agent.

Still another exemplary embodiment of the present invention is to provide a release agent whereby the release agent may further have an emulsifier, whereby the emulsifiers are produced from natural oils and bind oil and water components together. The emulsifiers may be oil in water and/or water in oil emulsifiers.

A further exemplary embodiment of the present invention is to provide a release agent whereby the release agent may have a fragrance.

Another exemplary embodiment of the present invention is to provide a release agent whereby the release agent may further include a coloring agent therein.

In another exemplary embodiment of the present invention, it is contemplated that a release agent may be provided whereby the release agent may also include at least a solvent additive.

A further exemplary embodiment of the present invention is to provide a release agent whereby the release agent may also have a solvent additive to increase the efficacy of the release agent in certain market segments, whereby the solvent may be a limonene which is extracted from a citrus find, methyl esters, biodiesels or ethyl lactate derived from lactic acid.

Yet another exemplary embodiment of the present invention is to provide a release agent whereby the release agent may contain an anti-oxidants which may prevent future oxidation of the oils. Peroxide formation once started will continue until it is terminated either because fatty acids are no longer available or anti-oxidants are added.

Still another exemplary embodiment of the present invention is to provide a release agent whereby the release agent may contain an anti-oxidants whereby the anti-oxidants may be synthetic or natural either in singular form or in combinations of products and formulas to achieve stability, longer shelf life, odor control and color preservation.

In yet another exemplary embodiment of the present invention, a release agent may be provided whereby the release agent may have a surfactant, which may act as a wetting agent that may lower the surface tension of the release agent, thus allowing for easier spreading of the release agent to a form, mixer, truck bed and the like.

Still a further exemplary embodiment of the present invention is to provide a release agent whereby the release agent may have a ionic liquid to dissolve a plurality of organic and inorganic solutes.

According to another aspect, the present invention comprises a method for forming a structure, by applying one of the inventive release agents to a form, mold, truck bed, mixer or other device, and then pouring or otherwise filling the device with asphalt, concrete, or another material to define the structure. The form, mold, or other device is then removed, leaving the structure intact.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
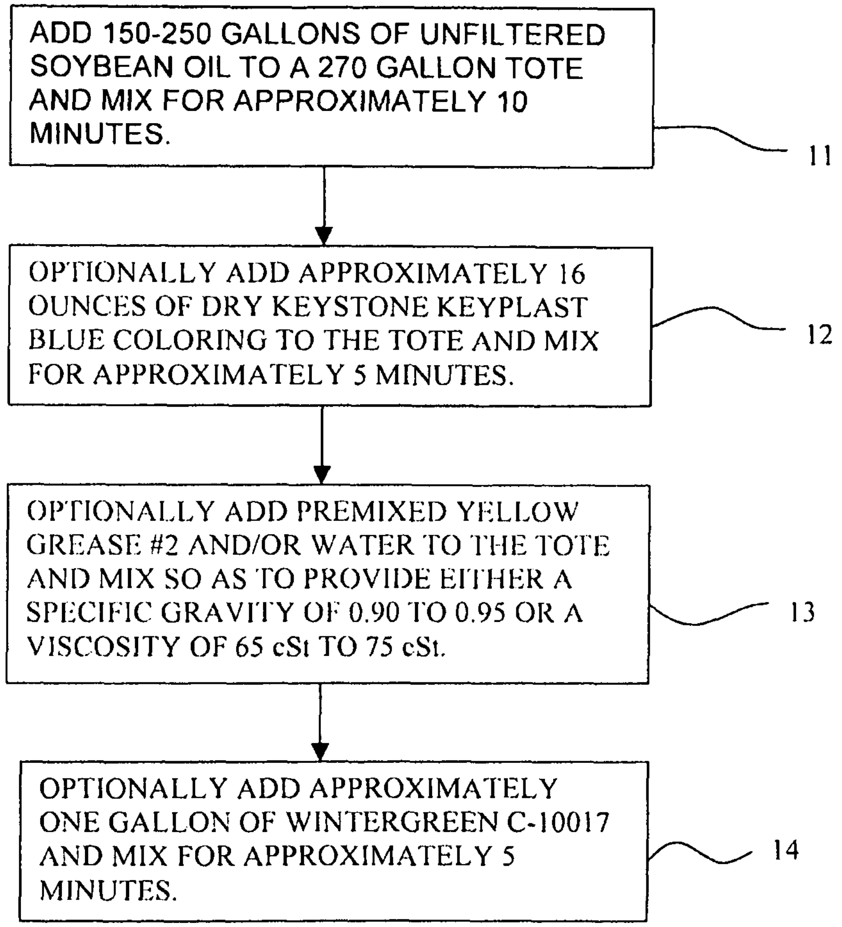
FIG. 1 is a flow chart showing one exemplary method for mixing a release agent according to the present invention.

As illustrated in the figures, according to at least one aspect of the present invention, a release agent having a relatively high viscosity and a high specific gravity may be provided. The release agent viscosity and gravity reading are typically as a result of the combination of high concentrations of oil in the agent. It is contemplated that a plurality of different oils, greases and other oil like products may be utilized and/or combined to create the release agent. It is further contemplated that a plurality of different oils may be utilized. However, in an exemplary embodiment, soybean oil and/or other types of vegetable oil are preferred because these vegetable oils provide the needed characteristics present for single application purposes and tend to be more environmentally friendly. Additionally, many types of vegetable oils are more readily available and are economically preferred because of their relatively low cost. Moreover, vegetable oils may be preferred because of their reusable nature and the ability to reprocess and recycle same. However, it should be understood that many different oils, greases and the like may also be suitable for use as a release agent. As described in the invention, the discussion of the present release agent is in no way limited to only any one exemplary embodiment. The term oil is used in its broadest sense, to include all manner of greases and fats.

In particular, contemplated release agents may include any desired vegetable oil, mineral oil, petroleum oil, or other type of oil, as well as combinations thereof. Examples of suitable vegetable oils other than soybean oil are canola oil and palm oil. However, other examples include peanut oil, babassu oil, coconut oil, cottonseed oil, grapeseed oil, maize oil, mustard seed oil, palm oil and the like. Those skilled in the art will appreciate that many other oils are likewise suitable.

It should also be understood that a plurality of different types of oils, greases and fats may be utilized to produce a release agent. Examples of different greases include frying oils, cooking oils, animal fat, lard, tallow, vegetable shortenings and the like. Those skilled in the art will appreciate that many other greases may be utilized.

In an exemplary embodiment, the release agents may have a viscosity of greater than approximately 65 cSt and/or a specific gravity of less than approximately 0.95. However, in another exemplary embodiment, the release agent may have a viscosity of between approximately 65-75 cSt, and/or has a specific gravity of between approximately 0.90 and 0.95. All ranges set forth herein should be interpreted as being inclusive of their endpoints, and all endpoints are deemed to be approximate. Most preferred release agents have a specific gravity of approximately 0.92-0.93 and/or has a viscosity of approximately 69-71 cSt. According to one exemplary embodiment, the release agent has a specific gravity of approximately 0.9242 and a viscosity of approximately 71.47 cSt.

All specific gravity values provided herein are for 60° F. All viscosity values provided herein are kinematic viscosity values for 25° C. and are given in centistokes (cSt).

The desired viscosity and/or specific gravity may be obtained by utilizing either a specific vegetable oil, such as soybean oil, and/or may be obtained by utilizing a plurality of oils, fats and greases in combination. The specific oil and/or combinations of oils preferrably have a low solid percentage whereby said oils and combinations thereof would have a solid percentage of under ten percent. However, the utilized oils, fats and greases may have a broader range and or other percentages of solids may alternatively be utilized.

In an exemplary embodiment, a source of the release agent may be previously utilized oils, such as the greases and oils utilized during the cooking process. This used oil may be filtered, and blended to produce the release agents desired. Further a combination of different types of cooking oils, greases and fats may be utilized to produce the release agents and these combinations of different oils may provide increase gravity and/or viscosity values as desired by the end user. Additionally, it is contemplated that unused oil may be combined with previously utilized oil to produce the release agent desired. It should be understood that even though the exemplary embodiment utilizes filtered, strained or low solid oils, greases and fats, these filtration, straining and processing means are not necessary to produce the desired release agents.

Other substances, such as other oils, grease, and/or water may be added to the main oil. Such additives may be added to provide the desired viscosity and/or specific gravity, or for some other purpose such as enhanced release qualities, reduced cost, better adhesion to surfaces and/or better spreading.

In an exemplary embodiment, a fragrance may be added to the release agent to allow for better smell to the end product which may also allow a user to know that the release agent has indeed been applied to a surface which in turn may cut down on re-application of the release agent. For example, if the release agent is utilized to coat a surface prior to construction work, the individual user may know that the surface has been coated if they smell the additive fragrance. Additionally, because the release agent does not need to re-applied every time to coat the surface of the desired device, if the user can still smell the fragrance, it will inform the individual user that the release agent is still present on the coated device and that it is unnecessary to re-apply the release agent to the surface.

Similarly, a color and/or foaming agent may also be added to the release agent to allow for visual inspection of the release agent to the end user. For example, if a color and/or foaming agent is applied to a surface as a coating, it will inform the end user that no application is needed. Additionally, if the color and/or foaming action remains after the product has been utilized for one project, it may signal to the user that re-application of the release agent is unnecessary until the coloring and/or foaming is not visible by the end user. Thereby, the release agent could be utilized multiple times without the need for re-coating and/or re-application of the release agent to the same surface to be used for a specific project.

Additionally, the addition of a fragrance may increase the marketability of the release agent by making it more pleasant to work with. Coloring may make the release agent easier to see, which can be important when the agent is applied to the inner walls of a poorly illuminated container, or to establish that multiple uses can be made of an earlier application with little or no re-application. Similarly, the addition of a foaming agent may make the release agent easier to see, help it cover surfaces, and provide enhanced release properties.

Additionally, a surfactant may be added to the release agent. A surfactant are typically a wetting agent that lower the surface tension of a liquid, allowing for easier spreading of the release agent and lowering the interfacial tension between the plurality of liquids that make up the release agent. As applied in the present invention, the surfactant may be found useful because it generally causes the release agent to spread more evenly upon a surface that a user wishes to coat.

Referring now to FIG. 1, one exemplary process for formulating the release agent of the present invention comprises adding 150 to 250 gallons of unfiltered soybean oil to a 270 gallon tote and mixing the soybean oil for approximately 10 minutes, as shown in block 11.

Optionally, approximately 16 ounces of dry Keystone™ Keyplastr™ Blue coloring are added to the tote, and mixed into the soybean oil for approximately 5 minutes, as shown in block 12. Other coloring agents can additionally or alternatively be used.

Optionally, premixed oil and/or water is also added to the tote, and mix for approximately 20 minutes as shown in block 13. The oil is preferably premixed for approximately 10 minutes. In one exemplary embodiment, the quantities of oil and/or water added in quantities that provide a specific gravity of the release agent of between 0.90 and 0.95, and/or that provide a viscosity of the resulting release agent of between 65 cSt and 75 cSt. Generally, adding filtered and/or lower solid percentage oil will increase the specific gravity of the release agent and will increase the viscosity thereof, while adding water will generally increase the specific gravity of the release agent and decrease the viscosity.

In another exemplary embodiment, a fragrance is then added to the release agent mixture to give a pleasant smell and to allow for identification of the release agent by the end user. It is contemplated that approximately 1 gallon of Wintergreen C-1007 fragrance is added to the tote and mixed for approximately 5 minutes, as shown in block 14. Of course, an innumerable number of other fragrances are also suitable. Despite the fact that a myriad of different substances and additives may optionally be added as discussed above, one of the simplest and most effective formulations consists entirely or almost entirely of soybean oil (either new or used). An especially preferred formulation in accordance with the example discussed above has a specific gravity of approximately 0.925 and a viscosity of approximately 70 cSt.

According to another aspect, the present invention comprises a method for forming a structure. Various different structures can be formed according to the present invention, including, for example, roadways, sidewalks, and curbs. As is well-known, such structures can be formed from asphalt or concrete. Additionally, building structures such as foundations and walls (such as those of concrete tilt-up construction) can similarly be formed. Indeed, those skilled in the art will appreciate that many different types of structures may be formed according to the present invention.

Figure 2:
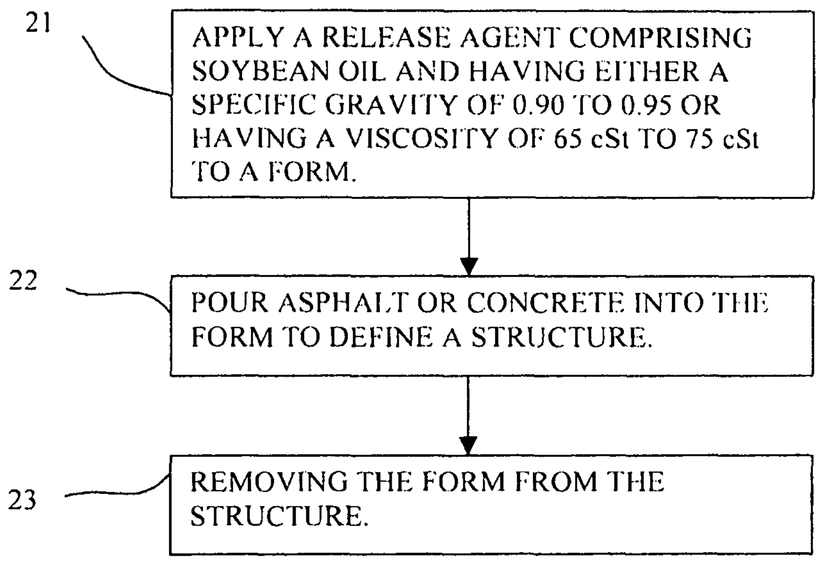
FIG. 2 is a flow chart showing one exemplary application of the release agent according to the present invention.

Referring now to FIG. 2, one example of forming a structure according to the present invention comprises applying a release agent formulated as described above to forms as shown in block 21. The forms may be wooden forms, metal forms, fiberglass forms, or forms made of any other desired material.

One advantage of applying a release agent according to the present invention to the forms (as opposed to applying a contemporary release agent to the forms), is that the release agent of the present invention is typically suitable for 4 to 12 uses. Contemporary release agents are typically only suitable for a single use. Thus, the use of a release agent formulated according to the present invention provides cost reductions both with respect to materials by reducing the amount of release agent required and with respect to labor by reducing the need for repeated applications thereof.

Focusing again on FIG. 2, asphalt, concrete, or the like is poured into the form as shown in block 22. As those skilled in the art will appreciate, various formulations of asphalt (and other heated bituminous aggregates) and concrete (including cement) may be utilized. Indeed, various other structural materials may be similarly utilized. Examples of other structural materials include epoxy resins and composite materials such as fiberglass, Kevlar™, and graphite fiber reinforced composite (GFRC).

Once the structure has at least partially cured, the form is removed from the structure as shown in block 23. Typically, forms are removed by disassembling them from the structure. Alternatively, the structure may be removed from the form in a manner which leaves the form generally intact.

As used herein, the term “form” is defined to include any mold, die, or other device which is used to define the shape of asphalt, concrete, or other material until the material at least partially cures.

In addition to providing a release agent for forms, the present invention provides a release agent suitable for use on various different tools, devices and containers. For example, the release agent of the present invention can be used to inhibit sticking of asphalt, concrete, and the like to the inner walls of containers within which these materials are stored and/or transported. The release agent of the present invention can also be used to inhibit such sticking to tools which are used to shape, smooth (such as trowels, floats, screeds, and the like), or otherwise manipulate these materials, as well as to inhibit sticking to the inner surfaces of pipes, troughs, ducts or other conduits through which these materials are moved, and to inhibit sticking in mixers within which these materials are mixed.

The present invention is suitable for forming a variety of different structures in a more cost effective manner. As discussed above, cost savings are realized by both a reduction in materials costs and a reduction in labor costs.

Figure 3:
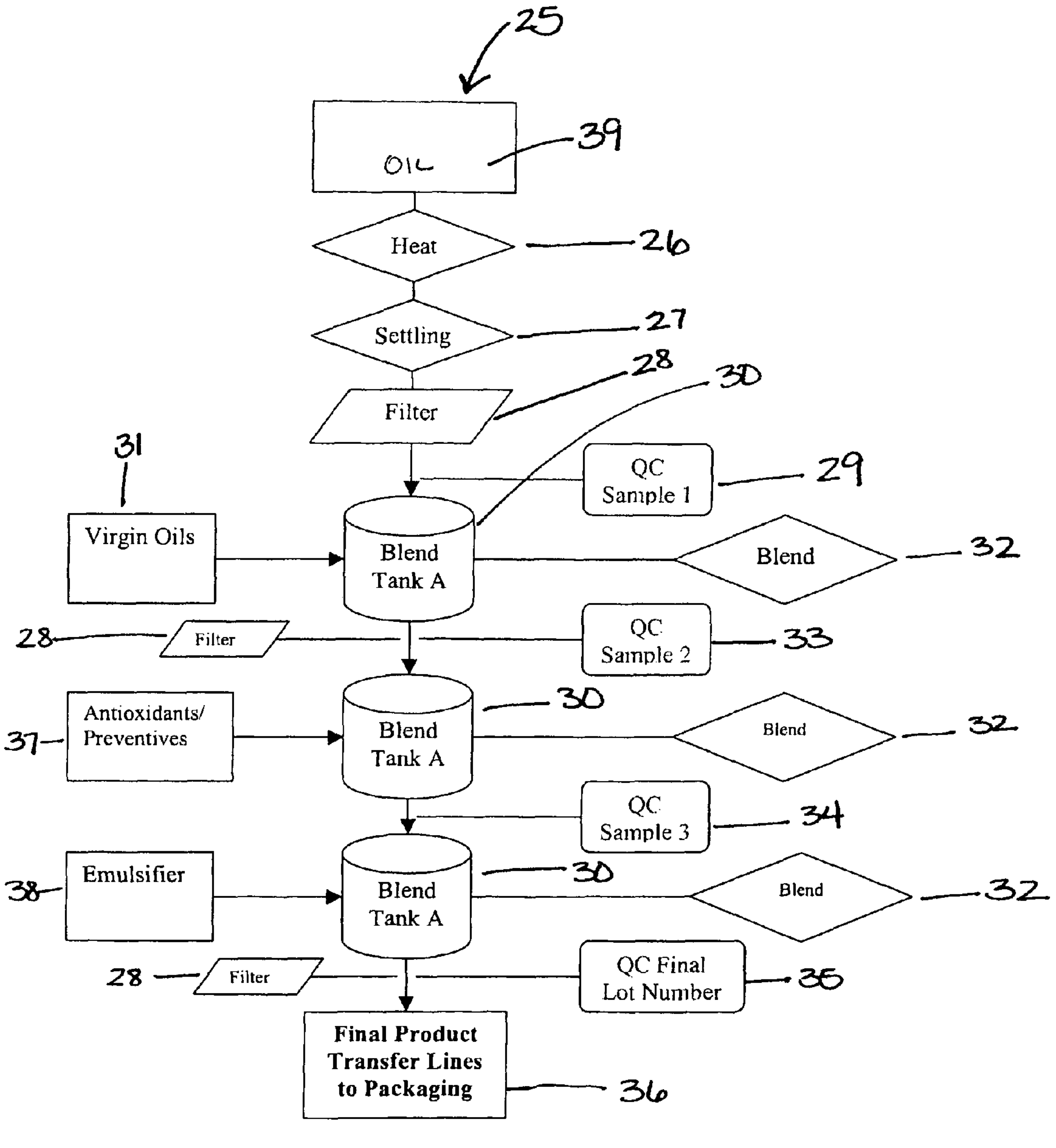
FIG. 3 is a flow chart illustrating one exemplary method of a production cycle of the present invention.

FIG. 3 illustrates the production cycle 25 of the release agent. As illustrated, the oil 39 may first be subjected to considerably heat which breaks down the oil 39 especially if the oil utilized is previously utilized oil and has particulate, solids and the like therein. After heating 26, the oil 39 allowed to settle 27 which may help in the separation of the particulate, impurities and any water (not shown) contained therein.

After separation, the oil 39 is filtered to remove any excess particulate undesirable as a release agent end product. Additionally, any excess solids and the like may be removed if they would decrease the viscosity or gravity of the end product.

At this point, a first sample 29 may be taken from the filtered release agent product to determine the viscosity and gravity of the remaining solution and may then be transported to a first blending tank 30 where if necessary, a quantity of virgin or unused oil 39 may be blended 32 with the previously utilized oil 39 to obtain the desired viscosity and gravity measurements for the end release agent.

After blending in a first blending tank 30, the solution may be transferred to a separate blending tank (not shown) where it may have other additives included therein. However, in an exemplary embodiment, the first blending tank 30 may be utilized for inclusion of the additives therein after a second sample 33 is retrieved to determine viscosity and gravity measurements. At this stage, the anti-oxidants and/or preventives 37 may be added to the first blending tank 30 whereby the anti-oxidants 37 may prevent future oxidation and degradation of the oil contained in the release agent. Preventives 37 may also be added to prolong the shelf life, control the odor of the release agent and preserve colors that may be added to the release agent.

As further illustrated in FIG. 3, a third sampling 34 may be retrieved from the blending tank 30 which may quantify the viscosity and gravity of the release agent and may further have a means for determining if enough anti-oxidants and preventives 37 have been added therein. After measurements have been verified, a emulsifier 38 may be added to the first blending tank 30 whereby the emulsifier 38 may dilute the formulation to decrease the viscosity if necessary. Contemplated emulsifiers include lactic acid, citric acid, tartaric acid and propylene glycol. However, as can be appreciated, a plurality of different emulsifiers may be utilized in the process to be added to the release agent.

After the emulsifier 38 has been added, coloring and other additives may be added to the release agent. A final measurement may be calculated by a final retrieval 35 in of the agent from the first blending tank 30. Once the viscosity and gravity requirements have been met, the final product may be processed 36 for packaging and distribution to the end user.

Additionally, other additives (not shown) may be added to the release agent. For example, a solvent additive which may increase the efficacy of the release agent may be added. The solvent additive may be a d-limonene which is a major component of citrus rind extractions.

Additionally, other solvents may include ethyl esters, methyl esters, ethyl lactate (from lactic acid), and bio-diesels.

Moreover, ionic liquids which are highly solvating, non-coordinating medium which may dissolve a variety of organic and inorganic solutes may be added. The ionic liquids may be effective as a solvent for a variety of compounds and they lack measurable vapor pressure, are non-volatile, non-flammable and have a high thermal stability.

Still another additive that may be added to a release agent is a freezing point depressant. Environmentally friendly freezing point depressants may be very beneficial in cold weather applications to ensure that the release agent maintains the appropriate viscosity and flow characteristics. Further, freezing point depressants may act to keep the release agent in a liquid state when applied in cold weather applications. Notable freezing point depressants may include, but are not limited to: propylene glycol, chloride slats, liquid magnesium chloride.

It is contemplated that many other types of additives may be included to the release agent to provide beneficial properties such as a polymer thickening agent, a pH buffer and a corrosion inhibitor.

Thus, specific embodiments and applications of the release agent of the present invention have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced.

What is claimed is:

1. A release agent having a viscosity greater than approximately 65 cSt at 25° C. and specific gravity between approximately 0.90 and approximately 0.95, wherein the release agent comprises:

at least one oil component;

an anti-oxidant;

an emulsifier selected from the group consisting of lactic acid, citric acid, acetic acid, tartaric acid and propylene glycol;

a solvent additive selected from the group consisting of limonene, methyl esters, biodiesels and ethyl lactate; and a surfactant.

2. The release agent of claim 1, further comprising a freezing point depressant.

3. The release agent of claim 1, wherein the release agent has a viscosity of between approximately 65 cSt and approximately 75 cSt at 25° C.

4. The release agent of claim 1, wherein the oil comprises unfiltered vegetable oil.

5. The release agent of claim 1, wherein the oil comprises filtered vegetable oil.

6. The release agent of claim 1, wherein the oil comprises unfiltered vegetable oil having approximately 6% to approximately 10%, by weight, of solids.

7. The release agent of claim 1, wherein the surfactant is soluble in organic solvents and water.

8. The release agent of claim 1, further comprising a coloring component to color the release agent.

9. The release agent of claim 1 further comprising an ionic liquid for dissolving a plurality of organic and inorganic solutes.

10. The release agent of claim 1, wherein the emulsifier is lactic acid.

11. The release agent of claim 1, wherein the anti-oxidant is added to the release agent to prevent oxidation of the oil and to provide stability, long shelf-life and odor control.

12. The release agent of claim 1, wherein the at least one oil component comprises a combination of fats, filtered oil, unfiltered oil and greases.

* * * * *